United States Patent [19]

Turner

[11] 4,423,365

[45] Dec. 27, 1983

[54] SERVO CONTROL CIRCUIT

[75] Inventor: James A. Turner, Binghamton, N.Y.

[73] Assignee: The Singer Company, Binghamton, N.Y.

[21] Appl. No.: 319,859

[22] Filed: Nov. 9, 1981

[51] Int. Cl.³ .............................................. G05B 13/00
[52] U.S. Cl. .................................... 318/561; 318/615; 318/632
[58] Field of Search .............. 318/561, 615, 616, 617, 318/632

[56] References Cited

U.S. PATENT DOCUMENTS

| 3,893,616 | 7/1975 | Trousdale | 318/561 |
| 4,130,786 | 12/1978 | Jacques | 318/561 |
| 4,298,833 | 11/1981 | Edwards et al. | 318/561 |
| 4,329,721 | 5/1982 | Lee et al. | 318/618 X |

Primary Examiner—B. Dobeck
Attorney, Agent, or Firm—Douglas M. Clarkson; Jeff Rothenberg

[57] ABSTRACT

The disclosure describes a digital servo control circuit to actuate an analog servo motor smoothly from an actual present position to a new desired servo position in response to digital information from a computer. The control circuit described receives from a computer digital information representative of a new position desired at a predetermined velocity rate. Such information normally is pre-timed to correspond with a preselected timing rate in the digital computer. A position signal generator is responsive to such pre-timed digital information to generate a predetermined number of position signals intermediate of the pre-timed digital information to achieve the desired smooth operation of the servo motor.

9 Claims, 3 Drawing Figures

SERVO CONTROL CIRCUIT

The United States Government has rights in this invention pursuant to Contract No. F33657-78-C-0592 with the Department of the Air Force.

BACKGROUND OF THE INVENTION

This invention, generally, relates to the field of simulation and, more particularly, to a new and improved control circuit for a servo motor.

Usually, an electrical servo motor operates from continuous analog signal inputs. However, present day simulators are driven by computer, which means that the signal inputs to control such an electrical servo motor are digital in form and are modified, or updated, only at the iteration rate of the computer.

It is well known from past experience with servo motor controls, in the computer field particularly, that digital data can be modified with greater accuracy than can analog data, and in addition, digital data has a higher immunity to noise. Whenever a servo control circuit is designed for high accuracy and high dynamic range, therefore, it is perferably in the digital format.

There is a requirement in the simulation field for a servo control to far exceed the normal control, i.e., such servo control should accept computer inputs at the computer's iteration rate; yet, provide pseudo continuous inputs to the servo motor. For example, such control in a simulator must be rapid and continuous to afford the kind of effectiveness required in the simulator field.

The types of servo control circuits available in this field, for example, to move a large gantry only a fraction of a centimeter, results in motion that is irregular, jerky, and discontinuous at the best. It is far from accurate, and when used to move a projector's line-of-sight in larger visual systems, the result is highly detramental to the realism sought to be achieved.

The servo control circuits available to move a projector's line-of-sight, therefore, must be limited in bandwidth or must have filters on the computer inputs in order to provide the smooth and continuous movement required to achieve the realism needed. The result is the loss of accuracy and the addition of delay, both highly detramental to realism.

SUMMARY OF THE INVENTION

Accordingly, it is a principal object of the invention to provide a digital servo control circuit which is operable directly from a digital computer.

Another object of the present invention is to provide a control circuit for operating a servo with more smoothness, with more precision, and with less delay than any control circuit heretofore.

Yet another object of the present invention is to provide a control circuit for operating a servo with finer control and with increased resolution in a manner that is more exact and precise than any control circuit heretofore.

A circuit to control an analog electrical servo in response to digital information, in accordance with the principles of the present invention, includes means to receive a digital signal in order to initiate movement in the servo drive device. The means to receive digital information from a computer, which is indicative of servo position and servo velocity of movement, are separate from each other so that better control and adjustments can be made.

Such digital information is pre-timed to correspond with a pre-selected timing rate, usually by the internal clocking mechanism within a digital computer. In response to this pre-timed digital information, a position signal generator circuit generates a predetermined number of position signals intermediate of the pre-timed digital signals. Thus, by this means, a servo drive device can be moved smoothly from an actual present position to a new servo position.

BRIEF DESCRIPTION OF THE DRAWINGS

The forgoing, other and further objects, features and advantages of the present invention will appear more fully from the detailed description of the presently preferred embodiment of the invention and from the claims appended hereto, when viewed in conjunction with the accompanying drawings, in which:

DETAILED DESCRIPTION OF THE PREFERRED EMBODIMENT

Figure 1:
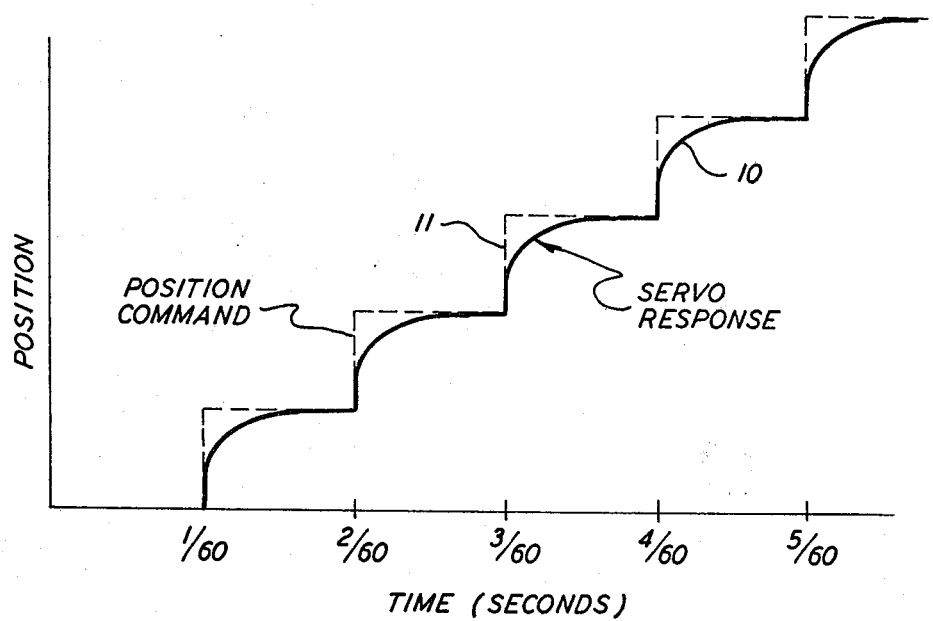
FIG. 1 is a response curve to show the control of a servo drive device with circuits heretofor known.

Referring now to FIG. 1 of the drawings, the numeral 10 identifies a response curve for a servo drive device under the control of circuits in the prior art. In this curve, the horizontal axis has a time scale measured in seconds, and the vertical axis is indicative of the position of the servo device.

Assuming that after 1/60th of a second, a computer emits a signal indicative of a new position for a servo device (not shown) to move. A line 11 is indicative of such a signal, which is sustained at this new level for another 1/60th of a second, and then, a second signal is emitted, similar to the first.

The servo device begins to move, as indicated by a line 10, and after the second signal from the computer, the movement is repeated by the servo device. In this manner of movement, a servo device proceeds as indicated by the curve 10.

Figure 2:
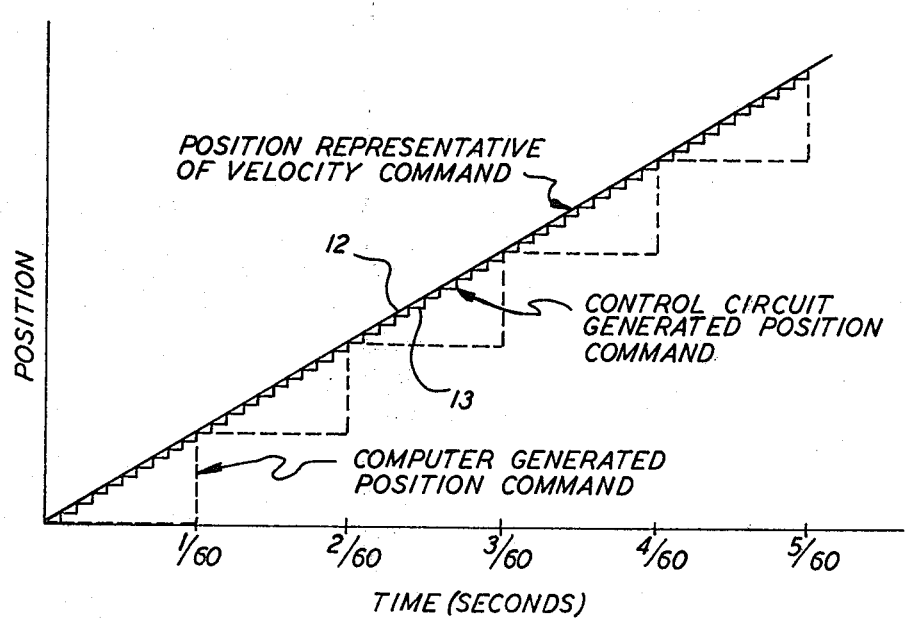
FIG. 2 is a response curve of a servo drive device being controlled by a circuit in accordance with the present invention.

In contrast, FIG. 2 of the drawings shows a servo response curve for a servo device controlled by a circuit in accordance with the invention. By the time the computer has emitted its first signal, indicated by the point 12 in FIG. 2, the circuit of the invention has already calculated a predetermined number of intermediate points, indicated by these small stepped line 13. Therefore, a circuit in accordance with the present invention will provide a fast response, smooth, high accuracy, signal to control a servo device.

A projector, that is moved by a servo device under the control of a circuit constructed in accordance with the invention, is used to project a high resolution image upon a screen which is viewed by a pilot trainee in a flight simulator. The location of the high resolution image is determined by the pilot's line-of-sight and is followed by the pilot's eye as he scans a lower resolution scene projected by a set of wide angle lens.

The technical advances in present day visual projection capabilities in flight simulators has created a real need for a fast response position servo for the type of eye motion called a "saccade". During a saccade, the eye accelerates and then decelerates in order to move from one position to another. Frequently, accelerations as high as 75,000 degrees per square second and velocities as high as 1500 degrees per second have been measured in time periods less than 100 milliseconds from start to stop.

In some instances, a servo device must achieve accelerations and velocities three times higher than those of the human eye in order to follow the eye movement to achieve the realism demanded by present day simulator technology. During a saccade, however, the required rates are less due to a pilot's perception.

A pilot's visual perception is markedly reduced during a saccade, with normal perception not returning completely until on the order of 100 milliseconds after the saccade. Therefore, the servo device is not required to follow the eye movement exactly during a saccade, but only to get the projected image at the eye position before normal perception returns, giving the servo device another 100 milliseconds to get to the final position.

It has been determined experimentally that a stepped type of motion equal to or less than one-third arc-minutes is not preceived by the human eye as steps but as a smooth motion. Further requirements for a servo device as used in projection systems in present day flight simulators is compounded because several servo devices are required to act together to move an image across a screen, and when a pilot tracts a moving image across the screen, all of the servo devices must move in unison so that the projected image does not move erraticly. Since different servo devices are driving different types of load, this requirement indicates that a high degree of control is required from each servo control circuit.

The position commands are provided by a computer at a rate of 60 times per second. With the capability of the human eye to track an object moving at a velocity of up to 200 degrees per second, a 60 times per second update results in step sizes that can be seen. To cause a visual scene to move smoothly, thereby enhancing realism, the servo control circuit of the invention generates smaller steps in order to fill in between each 60 cycle step from the computer. This is shown in FIG. 2 of the drawings.

With a given "desired velocity" and assumming a zero "position error", the output of the servo control circuit of the present invention would be just the desired velocity signal. However, with an error, the output of the servo control circuit is the velocity required to correct the position error plus the desired velocity. This relationship can be expressed as follows:

$$V_{out} = V_{cor} + V_{des}$$

where:
$V_{out}$=Velocity drive output to the servo
$V_{cor}$=Velocity required to correct the "position error"
$V_{des}$=the "desired Velocity"

Figure 3:
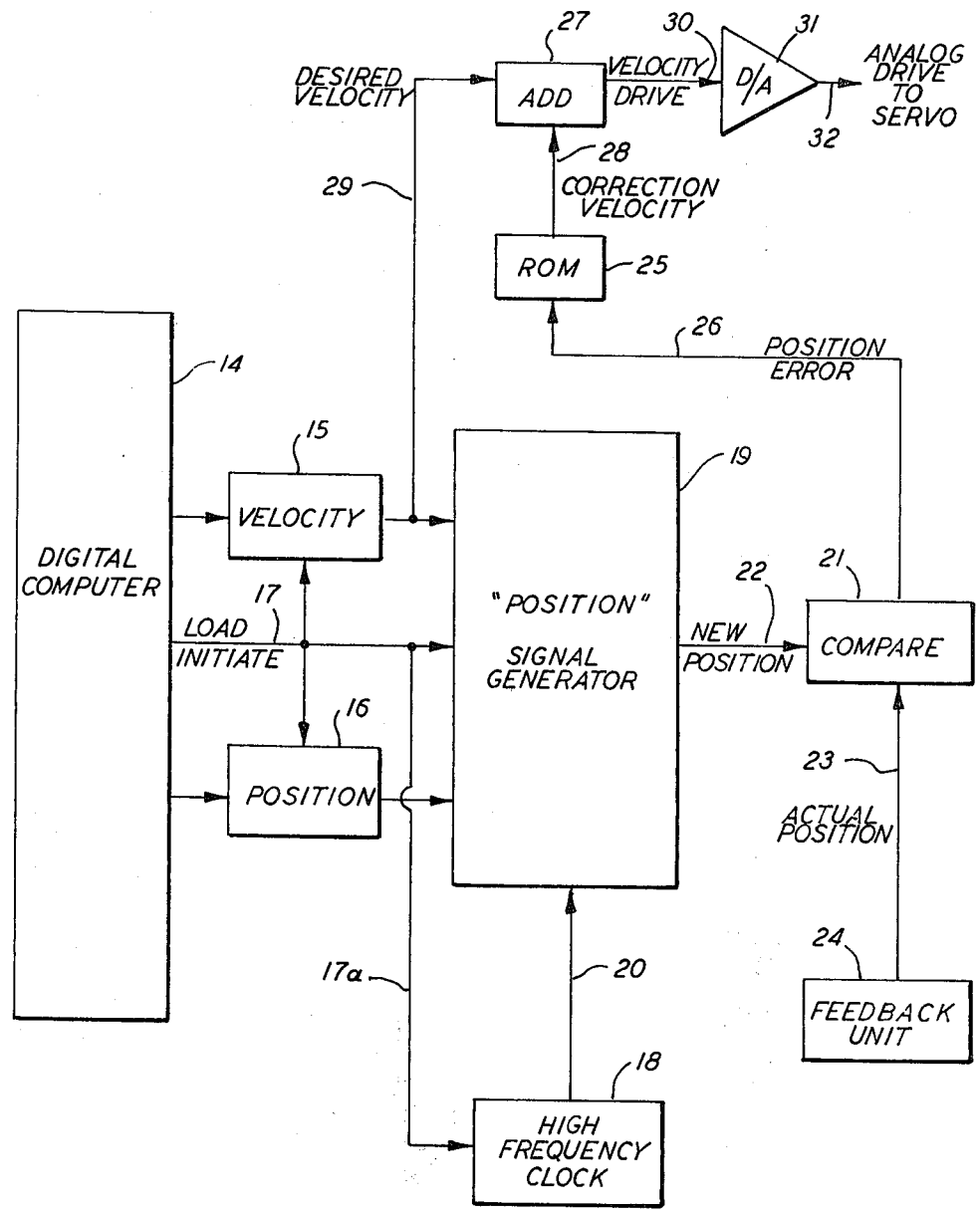
FIG. 3 is a circuit diagram in more detail showing respective component parts in order to achieve the degree of control depicted by the servo response curve of FIG. 2.

Referring now to FIG. 3 of the drawings in order to illustrate the circuit arrangement constructed in accordance with the principles of the present invention, a digital computer 14 furnishes both velocity and position data to a velocity circuit 15 and to a position circuit 16, respectively. Also, a load "initiate" connection 17 furnishes a signal at least every 1/60th of a second in order to initiate a timing action to be described now.

By means of a connection 17a, the "initiate" signal also resets a high frequency clock circuit 18 in order to obtain the intermediate "position command" signals to fill in between those from the computer. The high frequency clock signals generated by the circuit 18, which are in the order 5000 Hertz, are connected to the "position" signal generator 19 by a cable 20 in order to control the series of intermediate pulses 13, FIG. 2, intermediate of the computer-generated "position" command signals. The high frequency clock circuit 18, therefore, is reset by each of these computer-generated "position" command signals connected over the line 17a.

The "position" signal generator 19, therefore, generates a signal output indicative of the new position to which the servo device is to move and is connected to a "compare" circuit 21 over a connection 22. The "compare" circuit 21 has a second input terminal 23 over which a signal is received from feedback circuit 24 in order to determine the actual position of the servo device each instant of time, and is well known in the art. The feedback circuit 24, in other words, monitors actual movement of the servo device.

By comparing the new position signal over the input line 22 with the actual position signal of the servo device over the line 23, the "compare" circuit 21 then develops a "position error" signal which is connected directly to a Read-Only-Memory circuit 25 over an input connection 26. The Read-Only-Memory circuit 25 contains a velocity table of drive signal information which is selected by the "position error" signal from its smallest position error other than zero to the largest position error signal. However, a zero position error always is represented by a zero in the velocity table.

From time to time during the operation of the circuit of the present invention, it has been found desirable to calibrate the gain of the Read-Only-Memory circuit 25 in order to obtain the highest possible response without any overshoot of movement of the servo device. Therefore, this calibration is accomplished by increasing the gain of each of the permissible circuit component in this circuit until the overshoot occurs and, then, slightly decreasing the gain until the overshoot disappears.

An Adder circuit 27 has two input connections 28 and 29. The input connection 28 receives the output of the Read-Only-Memory circuit 25, which is a correction velocity as determined by the "position error" signal which it receives over the input connection 26. The other input connection 29 to the Adder circuit 27 is the desired velocity signal directly from the computer 14. By this arrangement, a velocity drive signal is connected to its output terminal 30 even when the correction velocity is zero and there is a desired velocity from the computer 14.

The velocity drive signal at the output terminal 30 of the Adder circuit 27 is connected directly to a Digital-to-Analog circuit 31 which converts the digital form of the signal to a suitable analog drive signal in order to drive the servo device over a connection 32.

Although the invention has been disclosed using specifically identified circuit components, it may be practiced also by using the logic elements in a digital computer along with proper programs. The separate clock circuit 18 providing a different higher frequency of clock signals may be provided also from a computer, as may the other functions described. Any number of possible combinations of computer logic and hardware are possible without deviating from the true spirit and scope of the present invention which is defined by the appended claims.

I claim:

1. In a simulator training apparatus having a plurality of operations controlled in response to digital information from a computer and at least some of said operations having moveable parts connected for movement by an analog servo motor device, a digital control circuit to actuate said analog servo motor device in response to said digital information, comprising:
   means to receive digital information from said digital computer indicative of a new servo position at a predetermined velocity rate,
   said digital information being pre-timed to correspond with a pre-selected timing rate,
   position signal generator means responsive to said pre-timed digital information to generate a predetermined number of position signals intermediate said pre-timed digital information, and
   Read-Only-Memory means to produce a correction velocity signal responsive to position signal information input,
   said digital control circuit being so constructed and arranged that said servo motor device is moved smoothly from an actual present position to said new servo position.

2. In a simulator training apparatus as set forth the claim 1 including feedback circuit means to generate signal information indicative of actual present servo position.

3. In a simulator training apparatus as set forth in claim 2 including compare circuit means to receive signal information from said feedback circuit means and digital information from said position signal generator means to produce a position error signal.

4. In a simulator training apparatus as set forth in claim 1 including means to generate clock pulses at a frequency rate higher than the frequency rate of said pre-timed digital information.

5. In a simulator training apparatus as set forth in claim 1 including circuit means to add said correction velocity signal to a desired correction velocity signal from said digital computer to produce a velocity drive signal.

6. In a simulator training apparatus as set forth in claim 2 including circuit mans to add said correction velocity signal to a desired correction velocity signal from said digital computer to produce a velocity drive signal.

7. In a simulator trainee apparatus as set forth in claim 3 including circuit means to add said correction velocity signal to a desired correction velocity signal from said digital computer to produce a velocity drive signal.

8. In a simulator trainee apparatus as set forth in claim 4 including circuit means to add said correction velocity signal to a desired correction velocity signal from said digital computer to produce a velocity drive signal.

9. In a simulator training apparatus as set forth in claim 5, 6, 7, or 8 including a digital-to-analog converter means to convert said digital velocity drive signal into an analog drive signal.

* * * * *